(12) United States Patent
Shao et al.

(10) Patent No.: US 12,474,676 B2
(45) Date of Patent: Nov. 18, 2025

(54) METHODS AND INTERNET OF THINGS (IOT) SYSTEMS FOR MONITORING GAS AT SMART GAS GATE STATIONS BASED ON SAFETY SUPERVISION

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Lei Zhang, Chengdu (CN); Siwei Zeng, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/056,792

(22) Filed: Feb. 19, 2025

(65) Prior Publication Data
US 2025/0189936 A1   Jun. 12, 2025

(30) Foreign Application Priority Data
Dec. 27, 2024   (CN) ......................... 202411944653.5

(51) Int. Cl.
G05B 9/02 (2006.01)
G16Y 40/10 (2020.01)
G16Y 40/50 (2020.01)

(52) U.S. Cl.
CPC ............... *G05B 9/02* (2013.01); *G16Y 40/10* (2020.01); *G16Y 40/50* (2020.01)

(58) Field of Classification Search
None
See application file for complete search history.

(56) References Cited

FOREIGN PATENT DOCUMENTS

CN    112833334 A  *  5/2021  ............... F17D 1/04
CN    216350624 U  *  4/2022
(Continued)

OTHER PUBLICATIONS

Machine translation of CN112833334A (Year: 2021).*
(Continued)

*Primary Examiner* — Kamini S Shah
*Assistant Examiner* — Istiaque Ahmed
(74) *Attorney, Agent, or Firm* — METIS IP LLC

(57) ABSTRACT

Provide are a method and an IoT system for monitoring gas at a smart gas gate station based on safety supervision. The method includes: obtaining gas monitoring data and determining a uniformity degree of the gas based on the gas monitoring data; in response to the uniformity degree satisfying a first preset condition, determining gas component data; obtaining environmental data; determining a component influence coefficient based on the uniformity degree and the environmental data; in response to the component influence coefficient satisfying a second preset condition, generating and transmitting a retrieval instruction to a gas user platform; determining a confidence weight corresponding to the feedback information; determining a monitoring accuracy based on the feedback information, the confidence weight, the gas component data, and the component influence coefficient; and generating and sending an adjustment instruction to a smart gas device object platform based on the monitoring accuracy.

4 Claims, 4 Drawing Sheets

(56) References Cited

FOREIGN PATENT DOCUMENTS

| | | | |
|---|---|---|---|
| CN | 114441710 A | * | 5/2022 |
| CN | 114965894 A | | 8/2022 |
| CN | 117786561 A | | 3/2024 |
| CN | 118133475 A | | 6/2024 |
| CN | 118189054 A | * | 6/2024 |
| CN | 118442548 A | | 8/2024 |
| CN | 118569814 A | | 8/2024 |
| CN | 118654240 A | | 9/2024 |
| CN | 118941173 A | | 11/2024 |
| CN | 119064098 A | * | 12/2024 |

OTHER PUBLICATIONS

Machine translation of CN114441710A (Year: 2022).*
Machine translation of CN118189054A (Year: 2024).*
Machine translation of CN119064098A (Year: 2024).*
Machine translation of CN216350624U (Year: 2022).*
First Office Action in Chinese Application No. 202411944653.5 mailed on Mar. 4, 2025, 13 pages.
Notification to Grant Patent Right for Invention in Chinese Application No. 202411944653.5 mailed on Mar. 18, 2025, 5 pages.
Liu, Menglan et al., The investigation about qualitative and quantitative methods about analysis of natural gas composition, Fujian Analysis & Testing, 24(4): 19-22, 2015.
Quan, Yaqiang et al., Smart gas safety management method based on active user degree, Safety in Production, 2024, 7 pages.

* cited by examiner

METHODS AND INTERNET OF THINGS (IOT) SYSTEMS FOR MONITORING GAS AT SMART GAS GATE STATIONS BASED ON SAFETY SUPERVISION

CROSS-REFERENCE TO RELATED APPLICATIONS

This application claims priority to Chinese Patent Application No. CN202411944653.5, filed on Dec. 27, 2024, the entire content of which is hereby incorporated by reference.

TECHNICAL FIELD

The present disclosure relates to the field of gas regulation, and in particular, to a method and an Internet of Things (IoT) system for monitoring gas at a smart gas gate station based on safety supervision.

BACKGROUND

In urban gas safety supervision, monitoring of a gas gate station by relevant government departments is an important link. Currently, the gas gate station primarily uses gas monitoring devices to monitor gas components. However, the gas monitoring devices may not ensure the accuracy and timeliness of monitoring data due to the presence of impurities or contaminants in gas pipelines, uneven distribution of gas entering the gas monitoring devices, malfunctions of the gas monitoring devices, or abnormal environmental impacts where the gas monitoring devices are located.

Therefore, it is desirable to provide a method and an IoT system for monitoring gas at a smart gas gate station based on safety supervision, which are capable of evaluating the accuracy of the monitoring data during the monitoring of the gas components, and making timely and targeted adjustments or maintenance of the gas monitoring devices to ensure the accuracy of gas monitoring.

SUMMARY

One or more embodiments of the present disclosure provide a method for monitoring gas at a smart gas gate station based on safety supervision. The method is executed by a smart gas government safety supervision management platform of an Internet of Things (IoT) system for monitoring gas at a smart gas gate station based on safety supervision. The method comprises: obtaining gas monitoring data uploaded by a gas company management platform through a smart gas government safety monitoring sensor network platform, and determining a uniformity degree of the gas based on the gas monitoring data; in response to the uniformity degree satisfying a first preset condition, controlling a composition analyzing device of a smart gas device object platform to collect a target gas, and determining gas component data based on the target gas, the composition analyzing device being deployed in a gas pipeline of the gas gate station; obtaining the gas component data and environmental data uploaded by the gas company management platform through the smart gas government safety monitoring sensor network platform; determining a component influence coefficient based on the uniformity degree and the environmental data; and in response to the component influence coefficient satisfying a second preset condition, generating and transmitting a retrieval instruction to a gas user platform, the retrieval instruction being used to instruct the gas user platform to obtain, based on a sampling parameter, feedback information uploaded by a gas user, the sampling parameter including a sampling time point. The method further incudes: determining a confidence weight corresponding to the feedback information based on the feedback information; determining a monitoring accuracy based on the feedback information, the confidence weight corresponding to the feedback information, the gas component data, and the component influence coefficient; and generating and sending an adjustment instruction to the smart gas device object platform based on the monitoring accuracy, the adjustment instruction being used for controlling the smart gas device object platform to adjust, based on a working parameter, at least one of the composition analyzing device and a pipeline regulating device deployed in the gas pipeline, the working parameter including an analysis accuracy of the composition analyzing device and at least one of a calibration cycle and an operating parameter of the pipeline regulating device.

One or more embodiments of the present disclosure provide an Internet of Things (IoT) system for monitoring gas at a smart gas gate station based on safety supervision, comprising a citizen user platform, a smart gas government safety monitoring service platform, a smart gas government safety supervision management platform, a smart gas government safety monitoring sensor network platform, a smart gas government safety monitoring object platform, a gas company management platform, a gas company sensor network platform, a smart gas device object platform, a gas user service platform, and a gas user platform. The smart gas government safety supervision management platform is configured to: obtain gas monitoring data uploaded by the gas company management platform through the smart gas government safety monitoring sensor network platform, and determining a uniformity degree of the gas based on the gas monitoring data; in response to the uniformity degree satisfying a first preset condition, control a composition analyzing device of the smart gas device object platform to collect a target gas, and determine gas component data based on the target gas, the composition analyzing device being deployed in a gas pipeline of the gas gate station; obtain the gas component data and environmental data uploaded by the gas company management platform through the smart gas government safety monitoring sensor network platform; determine a component influence coefficient based on the uniformity degree and the environmental data; and in response to the component influence coefficient satisfying a second preset condition, generate and transmit a retrieval instruction to the gas user platform, the retrieval instruction being used to instruct the gas user platform to obtain, based on a sampling parameter, feedback information uploaded by a gas user, the sampling parameter including a sampling time point. The smart gas government safety supervision management platform is further configured to: determine a confidence weight corresponding to the feedback information based on the feedback information; determine a monitoring accuracy based on the feedback information, the confidence weight corresponding to the feedback information, the gas component data, and the component influence coefficient; and generate and send an adjustment instruction to the smart gas device object platform based on the monitoring accuracy, the adjustment instruction being used for controlling the smart gas device object platform to adjust, based on a working parameter, at least one of the composition analyzing device and a pipeline regulating device deployed in the gas pipeline, the working parameter including an analysis accuracy of the composition analyzing device and at least one of a calibration cycle and an operating parameter of the pipeline regulating device.

One or more embodiments of the present disclosure provide a non-transitory computer-readable storage medium, the storage medium storing computer instructions. When a computer reads the computer instructions in the storage medium, the computer executes the method for gas monitoring at the smart gas gate station based on safety monitoring described in the present disclosure.

BRIEF DESCRIPTION OF THE DRAWINGS

The present disclosure will be further illustrated by way of exemplary embodiments, which are described in detail with the accompanying drawings. These embodiments are non-limiting. In these embodiments, the same count indicates the same structure, wherein.

DETAILED DESCRIPTION

Figure 1:
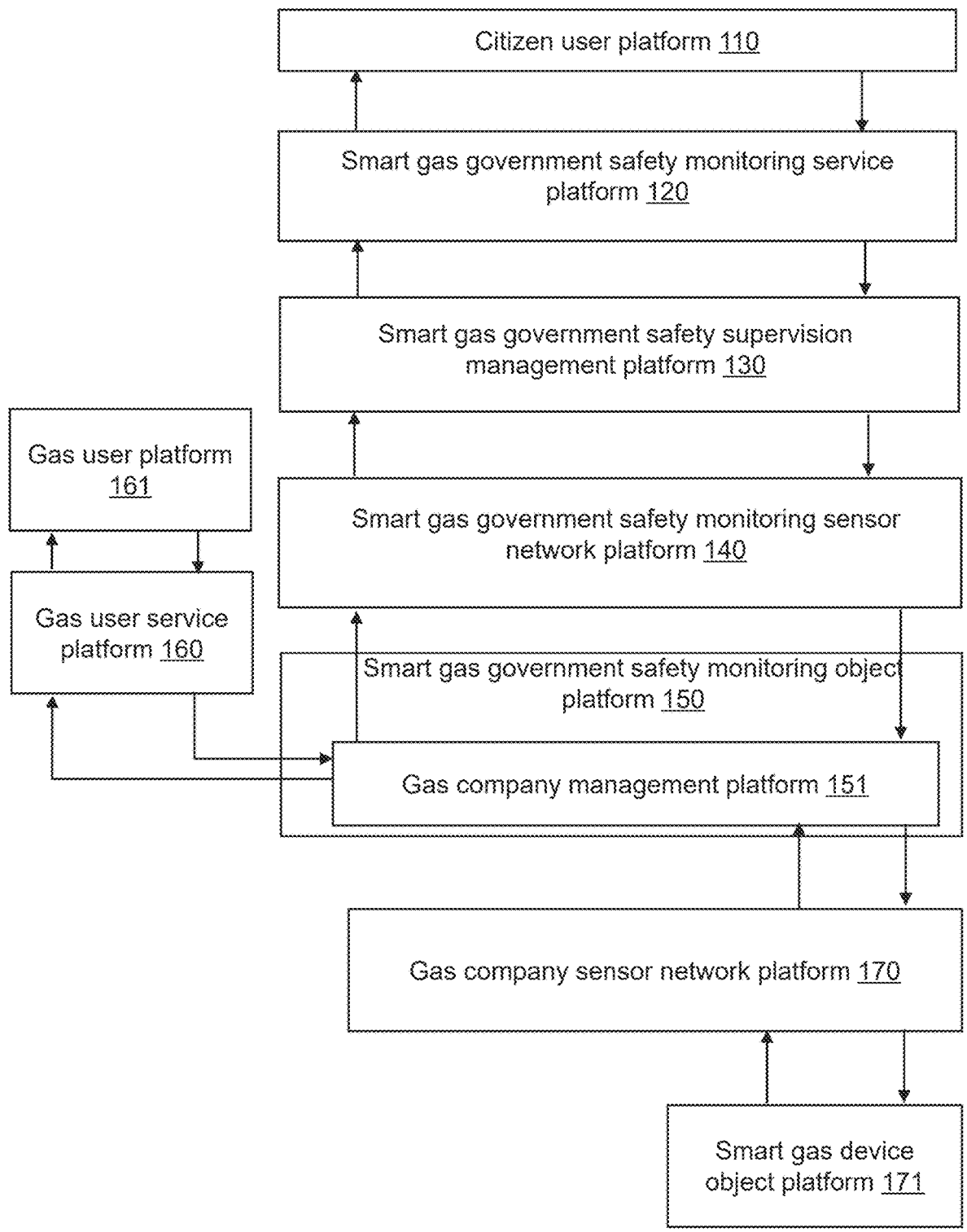
FIG. 1 is a block diagram of an exemplary Internet of Things (IoT) system for monitoring gas at a smart gas gate station based on safety supervision according to some embodiments of the present disclosure.

To more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

FIG. 1 is a block diagram of an exemplary Internet of Things (IoT) system for monitoring gas at a smart gas gate station based on safety supervision according to some embodiments of the present disclosure. As shown in FIG. 1, an IoT system 100 for monitoring gas at a smart gas gate station based on safety supervision (hereinafter referred to as the IoT system 100) may include a citizen user platform 110, a smart gas government safety monitoring service platform 120, a smart gas government safety supervision management platform 130, a smart gas government safety monitoring sensor network platform 140, a smart gas government safety monitoring object platform 150, a gas company management platform 151, a gas company sensor network platform 170, a smart gas device object platform 171, a gas user service platform 160, and a gas user platform 161. The platforms of the IoT system 100 are connected via network communication.

The citizen user platform 110 refers to a user-driven platform. For example, the citizen user platform may capture needs of a user and feed information back to the user.

In some embodiments, the citizen user platform 110 may interact with the smart gas government safety monitoring service platform 120.

The smart gas government safety monitoring service platform 120 refers to a platform for the government to provide information and services related to gas safety.

In some embodiments, the smart gas government safety monitoring service platform 120 may interact with the citizen user platform 110 and the smart gas government safety supervision management platform 130.

The smart gas government safety supervision management platform 130 refers to a management platform for the government to manage information related to gas safety.

In some embodiments, the smart gas government safety supervision management platform 130 may be configured to process and store data from the IoT system 100. In some embodiments, the smart gas government safety supervision management platform 130 may be set up on at least one distributed server. The distributed server includes a storage device, the storage device being used to store data of the IoT system 100. In some embodiments, the storage device may store a monitoring device parameter and a location of a composition analyzing device.

The smart gas government safety monitoring sensor network platform 140 refers to a platform used by the government for the management of sensor information related to gas safety.

In some embodiments, the smart gas government safety monitoring sensor network platform 140 may be configured as a communication network, a gateway, or the like.

In some embodiments, the smart gas government safety monitoring sensor network platform 140 may interact with the gas company management platform 151 and the smart gas government safety supervision management platform 130.

The smart gas government safety monitoring object platform 150 refers to a platform for the government to supervise the generation of information and control the execution of information. In some embodiments, the smart gas government safety monitoring object platform 150 may include the gas company management platform 151.

The gas company management platform 151 refers to a comprehensive management platform for gas company information. In some embodiments, the gas company management platform may be located within a server of a gas company.

In some embodiments, the gas company management platform may interact with the gas user service platform 160 and the gas company sensor network platform 170.

The gas company sensor network platform 170 refers to a platform that integrates and manages the sensor information of the gas company. In some embodiments, the gas company sensor network platform 170 may be provided on a communication device of the gas company.

The smart gas device object platform 171 refers to a functional platform for sensing information generation and control information execution. In some embodiments, the smart gas device object platform 171 includes a gas monitoring device, a composition analyzing device, and a pipeline regulating device, or the like. The gas gate station refers to a station that receives and distributes gas.

In some embodiments, the smart gas device object platform 171 may collect gas monitoring data, environmental data, and gas component data.

In some embodiments, the smart gas device object platform 171 may interact with the gas company sensor network platform 170.

The gas user service platform 160 refers to a platform that provides gas users with gas services. In some embodiments, the gas user service platform 160 may interact with the gas company management platform 151 and the gas user platform 161.

The gas user platform 161 is a platform used to interact with users. In some embodiments, the gas user platform 161 includes a device terminal (e.g., a smartphone, a tablet, etc.) used by the user.

In some embodiments, the IoT system 100 may further include a processor. In some embodiments, the processor may process information and data related to the IoT system 100 to perform one or more of the functions described in the present disclosure. By way of example only, the processor may include a central processing unit (CPU), an application-specific integrated circuit (ASIC), an application-specific instruction processor (ASIP), a graphics processor (GPU), etc., or any combination of the above. In some embodiments, the processor may interact with a plurality of platforms included in the IoT system 100.

Figure 2:
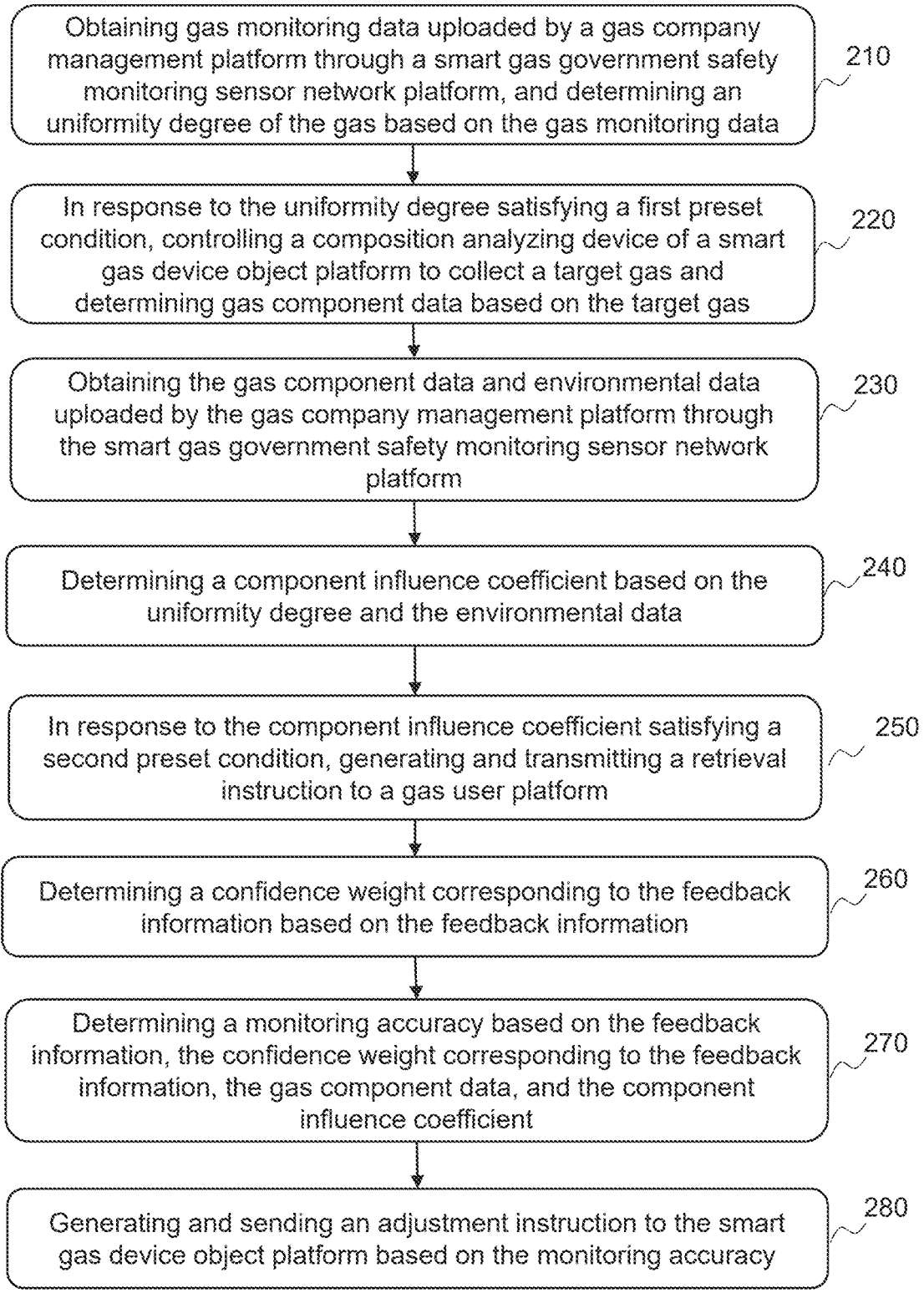
FIG. 2 is a flowchart of an exemplary process of a method for monitoring gas at a smart gas gate station based on safety supervision according to some embodiments of the present disclosure.
Figure 3:
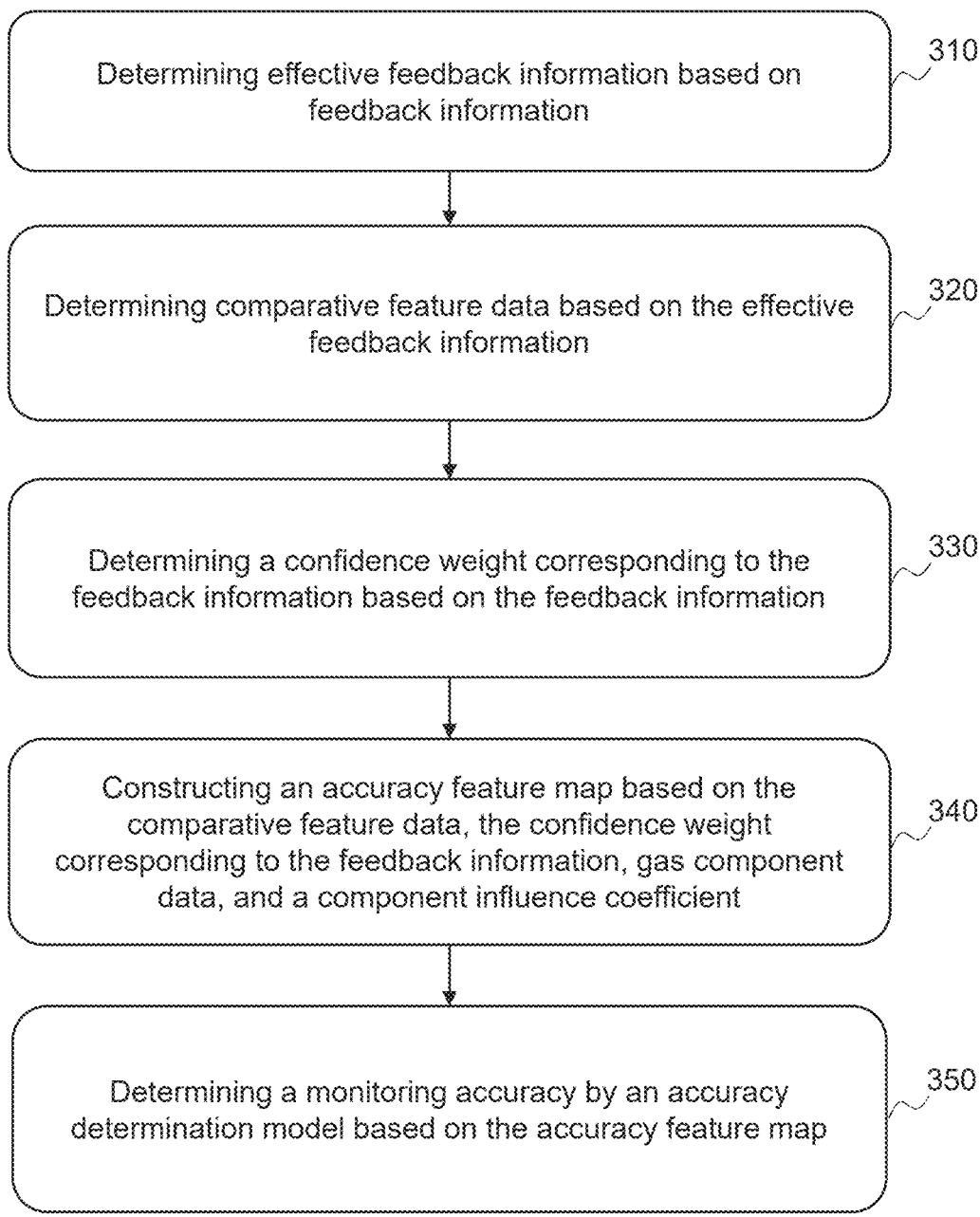
FIG. 3 is a flowchart of an exemplary process for determining a monitoring accuracy according to some embodiments of the present disclosure.
Figure 4:
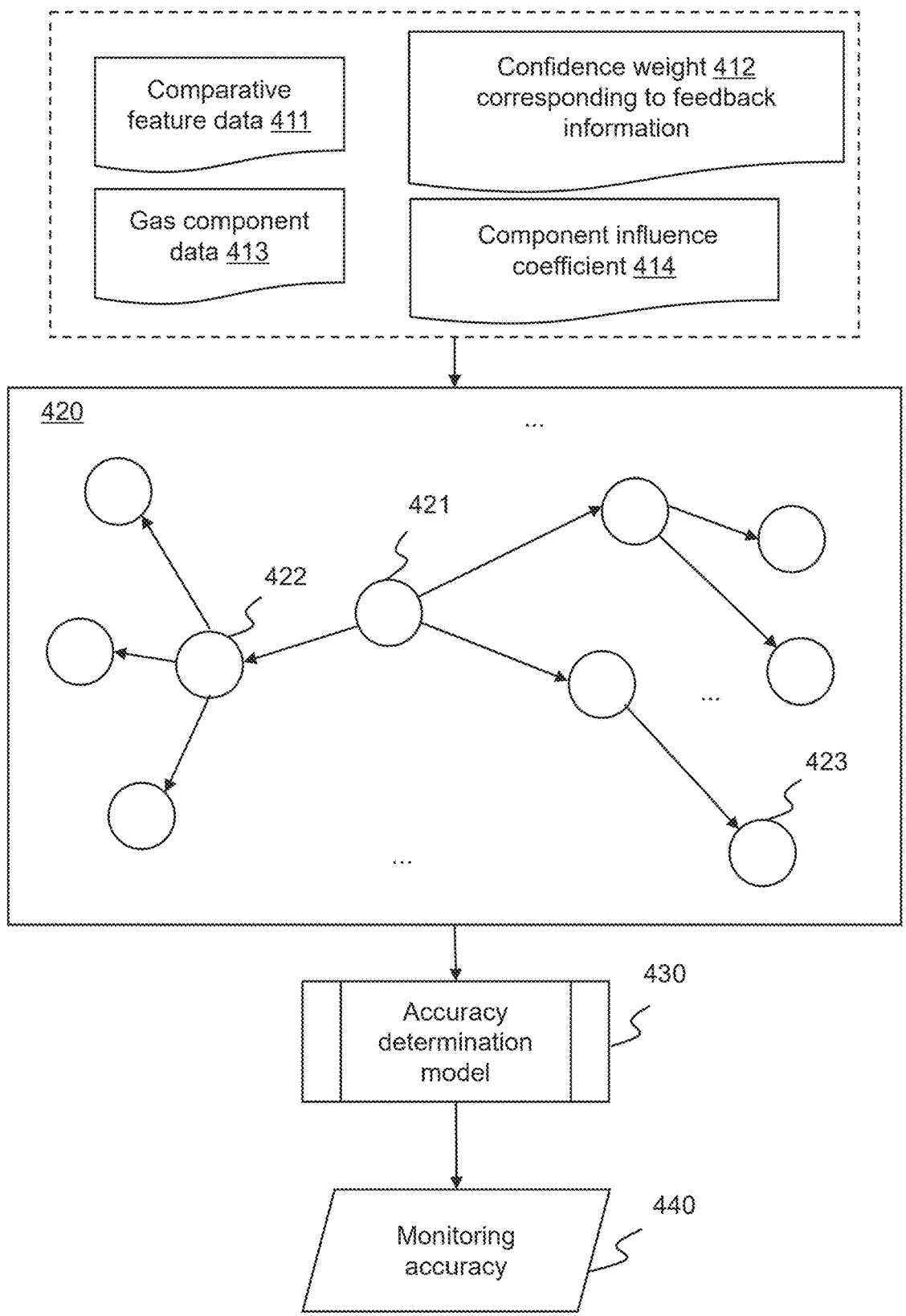
FIG. 4 is a schematic diagram of an exemplary accuracy determination model according to some embodiments of the present disclosure.

A detailed description of the foregoing can be found in the descriptions of FIG. 2 to FIG. 4.

Based on the IoT system 100, a closed loop of information operation between the various functional platforms can be formed, such that the platforms can operate in a coordinated and regulated manner, achieving smart and information-based gas monitoring at the smart gas gate station.

FIG. 2 is a flowchart of an exemplary process of a method for monitoring gas at a smart gas gate station based on safety supervision according to some embodiments of the present disclosure. In some embodiments, process 200 is performed by a smart gas government safety supervision management platform. As shown in FIG. 2, process 200 includes the following operations.

In 210, obtaining gas monitoring data uploaded by a gas company management platform through a smart gas government safety monitoring sensor network platform, and determining a uniformity degree of the gas based on the gas monitoring data.

The gas monitoring data refers to data obtained by monitoring the flow of gas in a gas pipeline. In some embodiments, the gas monitoring data may include a gas flow rate, a gas temperature, a gas pressure, or the like.

In some embodiments, the gas monitoring data may be captured and acquired by a plurality of gas monitoring devices arranged at different locations within the gas pipelines of a gas gate station. A gas monitoring device refers to a device that is configured to collect the gas monitoring data. For example, the gas monitoring device may include a gas flow rate meter, a digital thermometer, a digital manometer, or the like.

In some embodiments, the plurality of gas monitoring devices may send a plurality of pieces of gas monitoring data to a smart gas device object platform.

In some embodiments, the smart gas government safety supervision management platform may obtain the gas monitoring data uploaded by the gas company management platform via the smart gas government safety monitoring sensor network platform. The gas company management platform may obtain the gas monitoring data uploaded by the smart gas device object platform via a gas company sensor network platform. Descriptions regarding the above platforms may be found in FIG. 1 and the relevant descriptions thereof.

The uniformity degree of the gas may reflect a uniformity degree of gas flow in the gas pipeline and a uniformity degree of distribution of gas components. The higher the uniformity degree of the gas, the higher the uniformity degree of the gas flow in the gas pipeline and the higher the uniformity degree of the distribution of gas components.

In some embodiments, the uniformity degree of the gas may be expressed by a numerical value or rating. The higher the numerical value or rating, the higher the uniformity degree of the gas.

The higher the consistency of the gas monitoring data obtained by the gas monitoring devices at different locations, the higher the uniformity degree of the gas. In some embodiments, the smart gas government safety supervision management platform may determine the uniformity degree of the gas in a plurality of ways based on the plurality of pieces of gas monitoring data at different locations. For example, the smart gas government safety supervision management platform may determine a variance of the plurality of pieces of gas monitoring data acquired by gas monitoring devices at different locations at consecutive time points, and based on the variance of the plurality of pieces of gas monitoring data, determine the uniformity degree of the gas through a first correspondence. The first correspondence may include that the uniformity degree of the gas is negatively correlated to the variance of the plurality of pieces of gas monitoring data acquired by the gas monitoring devices at the different locations at the consecutive time points. The larger the variance is, the lower the uniformity degree of the gas is.

In some embodiments, the smart gas government safety supervision management platform may cluster the plurality of pieces of the gas monitoring data to form a plurality of clusters, with each cluster corresponding to a clustering center, and each clustering center corresponding to a piece of gas monitoring data. The smart gas government safety supervision management platform may determine the uniformity degree of the gas based on a count of the clusters through a second correspondence. The second correspondence may include that the uniformity degree of the gas is negatively correlated to the count of the clusters. The greater the count of the clusters is, the lower the uniformity degree of the gas is.

By way of example, the smart gas government safety supervision management platform may take the gas flow rate and the gas pressure in each piece of gas monitoring data as a clustering feature vector of the piece of gas monitoring data, and clustering a plurality of clustering feature vectors using a clustering algorithm to form the plurality of clusters. Types of clustering algorithm may include a K-Means clustering algorithm, a hierarchical clustering algorithm, or the like. The determination of the clustering center may be performed in any manner known to those skilled in the art.

In 220, in response to the uniformity degree satisfying a first preset condition, controlling a composition analyzing device of a smart gas device object platform to collect a target gas, and determining gas component data based on the target gas.

The first preset condition refers to a condition for determining whether the uniformity degree of the gas meets an accuracy requirement of the composition analyzing device. The composition analyzing device refers to a device for collecting the target gas and determining the gas component data based on the target gas. For example, the composition analyzing device may include a gas detector or the like. The accuracy requirement of the composition analyzing device is related to the uniformity degree. The higher the uniformity degree of the gas collected by the composition analyzing device is, the higher the accuracy requirement of the composition analyzing device is.

In some embodiments, the first preset condition may include the uniformity degree being greater than a uniformity threshold. The uniformity threshold may be pre-set based on historical experience.

The target gas is the gas for which gas monitoring is desired.

In some embodiments, the composition analyzing device may be deployed at a preset point location within the gas pipeline of the gas gate station to capture the target gas. The preset point location may be pre-determined based on historical experience.

The gas component data refers to data related to current gas components of the target gas. The gas component data may include the gas components of the target gas and the content of each component. The gas components may include methane, ethylene, isobutane, etc.

In some embodiments, the smart gas government safety supervision management platform may send a command via the smart gas government safety monitoring sensor network platform, the gas company management platform, and the gas company sensor network platform to the smart gas device object platform to control the composition analyzing device to collect the target gas and determine the gas component data based on the target gas. The composition analyzing device may automatically analyze and determine the gas component data based on the target gas.

In some embodiments, in response to the uniformity degree not satisfying the first preset condition, the smart gas government safety supervision management platform may generate and send an iterative regulating instruction to the smart gas device object platform.

The iterative regulating instruction refers to an instruction used to control the smart gas device object platform to adjust an operating parameter of a pipeline regulating device.

The pipeline regulating device refers to a device that regulates the flow of gas in the gas pipeline. The pipeline regulating device may include a gas valve, a pressure regulating valve, or the like. The gas valve is configured to regulate the gas flow rate in the gas pipeline. The pressure regulating valve is configured to regulate the gas pressure in the gas pipeline. The pipeline regulating device may be deployed in the gas pipeline of the gas gate station.

The operating parameter of the pipeline regulating device may include an opening degree of the gas valve, a power of the pressure regulating valve, or the like.

In some embodiments, the smart gas government safety supervision management platform may obtain a current operating parameter of the pipeline regulating device uploaded by the gas company management platform through the smart gas government safety monitoring sensor network platform, and iteratively adjust the operating parameter based on a preset increase parameter. The gas company management platform may obtain, via the gas company sensor network platform, the operating parameter of the pipeline regulating device uploaded by the smart gas device object platform.

In some embodiments, the iterative process of adjusting the operating parameter includes:

S1: in a first round of iteration, based on a first operating parameter and the preset increase parameter, the first operating parameter and the preset increase parameter are summed to obtain a second operating parameter. The first operating parameter refers to a current operating parameter of the pipeline regulating device. The second operating parameter refers to the operating parameter for a current round of iteration. The preset increase parameter refers to an increased value of the opening of the gas valve and an increased value of the power of the pressure regulating valve. The preset increase parameter may be pre-set based on historical experience. Increasing the opening of the gas valve and increasing the power of the pressure regulating valve can result in a more even gas flow.

S2: candidate monitoring data uploaded by the gas company management platform may be obtained through the smart gas government safety monitoring sensor network platform, and based on the candidate monitoring data, a candidate uniformity degree corresponding to the candidate monitoring data may be determined. The candidate monitoring data refers to the gas monitoring data after the pipeline regulating device operates according to the second operating parameter. The process of determining the candidate uniformity degree corresponding to the candidate monitoring data is similar to the process of determining the uniformity degree of the gas based on the gas monitoring data, which is not repeated here.

S3: in response to the candidate uniformity degree not satisfying the first preset condition, the second operating parameter is determined as the first operating parameter (i.e., a new first operating parameter) for a next round of iteration, and the next round of iteration is performed.

S4: in the next round of iteration, based on the new first operating parameter and the preset increase parameter, the new first operating parameter and the preset increase parameter are summed to obtain a new second operating parameter, and S2 is repeated to determine the candidate uniformity degree corresponding to the candidate monitoring data. In response to the candidate uniformity degree not satisfying the first preset condition, the second operating parameter is determined as the first operating parameter for a next round of iteration, and the next round of iteration continues. The iterations may be performed for n rounds, wherein n is a count threshold.

S5: in response to the candidate uniformity degree satisfying the first preset condition or the count of iterations being greater than the count threshold, the iteration is stopped. The count threshold may be pre-set based on historical experience. The operating parameter obtained after the iterations are stopped is determined as the iterative regulating instruction and sent to the smart gas device object platform to control the composition analyzing device to collect the target gas and determine the gas component data based on the target gas. Descriptions on determining the gas component data may be found in the related description above.

By adjusting the operating parameter of the pipeline regulating device, it is possible to make an environment in which the gas is collected by the composition analyzing device more stable, and the uniformity degree of the collected gas is more uniform, and thus more accurate gas component data can be obtained.

In 230, obtaining the gas component data and environmental data uploaded by the gas company management platform through the smart gas government safety monitoring sensor network platform.

The environmental data refers to data related to an environment in which the composition analyzing device is located. In some embodiments, the environmental data may include a temperature, a humidity, or the like of the environment in which the composition analyzing device is located.

In some embodiments, the environmental data may be collected by an environmental monitoring device deployed around the composition analyzing device. The environmental monitoring device may include a thermometer, a hygrometer, or the like. The environmental monitoring device may send the environmental data to the smart gas device object platform.

In some embodiments, the smart gas government safety supervision management platform may obtain the gas component data and the environmental data uploaded by the gas company management platform through the smart gas government safety monitoring sensor network platform. The gas company management platform may obtain, via the gas company sensor network platform, the gas component data and the environmental data uploaded by the smart gas device object platform.

In 240, determining a component influence coefficient based on the uniformity degree and the environmental data.

The component influence coefficient may reflect a degree of influence of the environment in which the composition analyzing device is located on the accuracy of the composition analyzing device. The greater the component influence coefficient is, the greater the degree of influence of the environment in which the composition analyzing device is located on the accuracy of the composition analyzing device.

In some embodiments, the smart gas government safety supervision management platform may determine the component influence coefficient in a plurality of ways based on the uniformity degree and the environmental data. For example, the smart gas government safety supervision management platform may identify a reference influence coefficient corresponding to the uniformity degree and the environmental data by querying a preset coefficient table based on the uniformity degree and the environmental data, and determine the reference influence coefficient as the component influence coefficient. The preset coefficient table may be pre-set based on historical data. The preset coefficient table includes a plurality of sets of uniformity degrees and environmental data and the reference influence coefficient corresponding to each set of the plurality of sets of uniformity degrees and environmental data. The reference influence coefficient may be determined by manual labeling.

In some embodiments, the smart gas government safety supervision management platform may determine the uniformity degree based on the gas monitoring data, a monitoring device parameter, and determine the component influence coefficient based on the uniformity degree, the environmental data, and the gas component data.

The monitoring device parameter refers to data associated with the gas monitoring device. In some embodiments, the monitoring device parameter may include distribution locations of gas monitoring devices. The distribution locations of gas monitoring devices refer to locations where a plurality of the gas monitoring devices are installed in different gas pipelines.

In some embodiments, the smart gas government safety supervision management platform may obtain the monitoring device parameter via a storage device. Descriptions of the storage device may be found in the related description of FIG. 1.

In some embodiments, the smart gas government safety supervision management platform may, based on the gas monitoring data and the monitoring device parameter, use a location of the composition analyzing device as ta center of a circle, and divide a region in which the gas monitoring devices are distributed into a plurality of sub-regions within a preset radius range. The smart gas government safety supervision management platform may determine a variance of the gas monitoring data collected by the gas monitoring devices in each sub-region, perform a weighted summation on the variances corresponding to the plurality of sub-regions, and determine a result of the weighted summation as the uniformity degree. The preset radius range and a weight of the variance corresponding to each sub-region may be set in advance based on historical experience. The closer a sub-region is to the location of the composition analyzing device, the higher the weight of the variance corresponding to the sub-region is.

It may be understood that the closer the gas monitoring device is to the composition analyzing device, the more similar the gas monitoring data collected by the gas monitoring device is to the gas monitoring data of the gas pipeline where the composition analyzing device is located. Consequently, the uniformity degree corresponding to the gas monitoring data collected by the gas monitoring device and the uniformity degree corresponding to the gas monitoring data of the gas pipeline where the composition analyzing device is located are more similar, which makes the similarity in uniformity degrees more important in determining the uniformity degree. Therefore, the closer the sub-region is to the location of the composition analyzing device, the higher the weight of the variance corresponding to the sub-region is.

By way of example, the smart gas government safety supervision management platform may, based on the gas monitoring data and the monitoring device parameter, use the location of the composition analyzing device as the center, divide a region within a radius of 10 meters into a first sub-region, and divide a region within a radius ranging from 10 to 20 meters into a second sub-region. The mart gas government safety supervision management platform may determine the variance of the gas monitoring data collected by the gas monitoring device in the two sub-regions, perform a weighted summation on the variances corresponding to the two sub-regions, and determine the result of the weighted summation as the uniformity degree.

In some embodiments, the smart gas government safety supervision management platform may obtain the location of the composition analyzing device via the storage device.

In some embodiments, the smart gas government safety supervision management platform may construct a target feature vector based on the uniformity degree, the environmental data, and the gas component data, match the target feature vector with a first reference vector in a first vector database that satisfies a preset matching condition, and determine the reference influence coefficient corresponding to the first reference vector that satisfies the preset matching condition as the component influence coefficient. The target feature vector is a feature vector constructed based on the uniformity degree, the environmental data, the gas component data, and a mutation parameter. In some embodiments, the preset matching condition may include a vector distance being less than a distance threshold. The vector distance may include a Euclidean distance, a cosine distance, or the like, and the distance threshold may be preset.

In some embodiments, the target feature vector may include the mutation parameter. The mutation parameter may characterize a difference between the current gas component data and historical component data. The greater the difference is, the greater the mutation parameter is. The historical component data refers to gas component data acquired during a first historical time. The first historical time refers to a preset time period before the current time point.

In some embodiments, the smart gas government safety supervision management platform may determine an average of a plurality of pieces of gas component data acquired during the first historical time, and determine the average as the historical component data.

In some embodiments, the smart gas government safety supervision management platform may construct a first vector database based on historical data. The first vector database may include a plurality of first reference vectors and a reference influence coefficient corresponding to each of the first reference vectors. The first reference vector may be a feature vector constructed based on a historical uniformity degree, historical environmental data, and historical component data in the historical data. The reference influence coefficient may be determined by manual labeling. If the target feature vector includes the mutation parameter, the first reference vector includes a historical mutation parameter. The historical mutation parameter in the first reference vector may characterize a difference between the historical component data corresponding to the first reference vector and first historical component data. The first historical component data refers to gas component data obtained during a second historical time. The first historical time and the second historical time may be pre-set, and the second historical time precedes the first historical time.

Considering the importance of the gas monitoring data acquired at different locations when determining the uniformity degree, a more realistic uniformity degree can be obtained. Because different components of the gas may be affected differently by the environment and the uniformity degree and may interact with each other under the influence of the environment and the uniformity degree, a more accurate component influence coefficient can be determined based on the uniformity degree, the environmental data, the gas component data, and the mutation parameter.

In some embodiments, the smart gas government safety supervision management platform may determine the component influence coefficient based on the uniformity degree, the environmental data, the gas component data, the historical component data, and historical maintenance data through a coefficient determination model.

The historical maintenance data refers to data related to the maintenance of the composition analyzing device during the first historical time. In some embodiments, the historical maintenance data may include a maintenance time period, or the like. The historical maintenance data may be stored in the storage device, and the smart gas government safety supervision management platform may access the monitoring device parameter through the storage device.

In some embodiments, the coefficient determination model refers to a model for determining the component influence coefficient. The coefficient determination model may be a machine learning model. For example, the coefficient determination model may include a Recurrent Neural Network (RNN) model, a customized model, or any combination thereof.

In some embodiments, the smart gas government safety supervision management platform may obtain the coefficient determination model based on a large number of first training samples with first labels, using manners such as gradient descent, etc. The first training sample may include a sample uniformity degree, sample environmental data, sample gas component data, sample historical component data, and sample historical maintenance data. The first label of the first training sample may be a component influence coefficient corresponding to the sample gas component data. In some embodiments, the first training sample may be obtained based on the historical data.

In some embodiments, the smart gas government safety supervision management platform may compare a difference between standard gas component data and the sample gas component data, and determine the component influence coefficient corresponding to the sample gas component data through a third correspondence. The third correspondence may include that the larger the difference between the standard gas component data and the sample gas component data, the higher the component influence coefficient corresponding to the sample gas component data.

The standard gas component data refers to gas component data obtained under a standard monitoring condition. The standard monitoring condition refers to a condition in which the accuracy of the composition analyzing device is in accordance with standards for gas monitoring. In some embodiments, the smart gas government safety supervision management platform may obtain a plurality of pieces of gas component data for a plurality of batches of gas under the standard monitoring condition, determine an average value of the plurality of pieces of gas component data, and determine the average value as the standard gas component data.

In some embodiments, a training process of the coefficient determination model may include: inputting a plurality of first training samples with first labels into an initial coefficient determination model, constructing a loss function based on the first labels and a prediction results of the initial coefficient determination model, updating the initial coefficient determination model iteratively based on the loss function, and completing the training of the coefficient determination model when the loss function of the initial coefficient determination model satisfies a preset loss condition. The preset loss condition may be that the loss function converges, a count of iterations reaches a set value, or the like.

By processing the uniformity degree, the environmental data, the gas component data, the historical component data, and the historical maintenance data through the coefficient determination model, the unique advantages of the machine learning model can be utilized to clarify a relationship between input content and output results based on a large volume of complex data, thereby obtaining a more accurate component influence coefficient.

In 250, in response to the component influence coefficient satisfying a second preset condition, generating and transmitting a retrieval instruction to a gas user platform.

The second preset condition refers to a condition for determining whether or not there is a need to assess the accuracy of the composition analyzing device. In some embodiments, the second preset condition may include the component influence coefficient being greater than an influence threshold, or the like.

In some embodiments, the influence threshold may be determined based on a historical monitoring accuracy of the composition analyzing device. The lower the historical monitoring accuracy is, the lower the influence threshold is. The historical monitoring accuracy refers to a monitoring accuracy in the historical data. In some embodiments, the smart gas government safety supervision management platform may average a plurality of monitoring accuracies over the first historical time, and determine the average as the historical monitoring accuracy. Descriptions of determining the monitoring accuracy may be found in the related description below.

The retrieval instruction refers to an instruction used to instruct the gas user platform to fetch feedback information uploaded by a gas user according to a sampling parameter.

The sampling parameter refers to data related to obtaining the feedback information uploaded by the gas user. In some embodiments, the sampling parameter may include a sampling time point. The sampling time point refers to a point in time when the feedback information is obtained after the smart gas government safety supervision management platform generates and sends the retrieval instruction to the gas user platform.

In some embodiments, the smart gas government safety supervision management platform may determine a ratio of a conveyance distance to the gas flow rate in the gas monitoring data, and determine the ratio as the sampling time point. The conveyance distance refers to a distance between the gas user and the composition analyzing device. In some embodiments, the conveyance distance may be stored in the storage device.

In some embodiments, the gas user platform may obtain the feedback information uploaded by the gas user in accordance with the sampling parameter.

The feedback information refers to the information related to gas usage fed back by different gas users. The feedback information includes a picture, a video, a text, an audio, or the like. For example, the feedback information may be a video of gas combustion, a text indicating that the color of a combustion flame is incorrect, etc. In some embodiments, the gas user may include a user that uses gas for industrial production.

In some embodiments, when the feedback information is in the form of a video, the sampling parameter may also include a specified frame of the video. The specified frame of the video may be pre-set based on historical experience. Acquiring only the specified frame of the video reduces the amount of data that needs to be processed.

In 260, determining a confidence weight corresponding to the feedback information based on the feedback information.

The confidence weight may reflect a degree of confidence in the feedback information.

In some embodiments, the confidence weight of the feedback information may be related to a position of the gas user in a gas pipeline network corresponding to the feedback information. The smart gas government safety supervision management platform may determine the confidence weight corresponding to the feedback information based on the location of the gas user corresponding to the feedback information through a fourth correspondence. The fourth correspondence may include that the confidence weight of the feedback information corresponding to a gas user at an upstream location of the gas pipeline network is greater than the confidence weight of the feedback information corresponding to a gas user at a downstream location of the gas pipeline network.

It may be understood that the gas used by the gas user at the upstream location is closer to the target gas, and the gas used by the gas user at the downstream location, due to the increased delivery distance, may pass through other gas stations and pipelines, potentially mixing with more impurities and thus differing more from the target gas. Therefore, the confidence weight of the feedback information corresponding to the gas user at the upstream location of the gas pipeline network is greater than that the confidence weight of the feedback information corresponding to the gas user at the downstream location of the gas pipeline network.

In some embodiments, the location of the gas user may be stored in the storage device.

In some embodiments, the confidence weight may be related to a historical monitoring discrepancy degree, and the smart gas government safety supervision management platform may determine the confidence weight corresponding to the feedback information based on the historical monitoring discrepancy degree. Descriptions regarding this section may be found in FIG. 3 and relevant descriptions thereof.

In 270, determining a monitoring accuracy based on the feedback information, the confidence weight corresponding to the feedback information, the gas component data, and the component influence coefficient.

The monitoring accuracy may reflect how accurate the gas component data is.

In some embodiments, the smart gas government safety supervision management platform may determine the monitoring accuracy in a plurality of ways based on the feedback information, the confidence weight corresponding to the feedback information, the gas component data, and the component influence coefficient. For example, the smart gas government safety supervision management platform may query a preset table to identify a reference accuracy that corresponds to the feedback information, the confidence weight corresponding to the feedback information, the gas component data, and the component influence coefficient, and determining the reference accuracy as the monitoring accuracy. The preset table may be preset based on the historical data. The preset table includes a plurality of sets of information and data and reference accuracies corresponding to the plurality of sets of information and data, wherein the plurality of sets of information and data include feedback information, confidence weights corresponding to the feedback information, gas component data, and component influence coefficients. The reference accuracies may be determined by manual labeling.

In some embodiments, the smart gas government safety supervision management platform may determine the monitoring accuracy based on comparative feature data, the confidence weight corresponding to the feedback information, the gas component data, and the component influence coefficient. Descriptions regarding this section may be found in FIG. 3 and relevant descriptions thereof In 280, generating and sending an adjustment instruction to the smart gas device object platform based on the monitoring accuracy.

The adjustment instruction refers to an instruction used to control the smart gas device object platform to adjust at least one of the composition analyzing device or the pipeline regulating device in accordance with a working parameter.

The working parameter refers to a parameter related to the operation of at least one of the composition analyzing device or the pipeline regulating device. In some embodiments, the working parameter may include an accuracy of the composition analyzing device, a calibration cycle, the operating parameter of the pipeline regulating device, or the like. The calibration cycle refers to a time interval for calibrating the composition analyzing device. More descriptions of the operating parameter may be found in the relevant description above.

In some embodiments, after receiving the adjustment instruction, the smart gas device object platform may send the calibration cycle to a maintenance person, who may calibrate the composition analyzing device based on the calibration cycle.

In some embodiments, the smart gas government safety supervision management platform may determine the adjustment instruction based on the monitoring accuracy in a plurality of ways. For example, the smart gas government safety supervision management platform may determine the working parameter based on the monitoring accuracy through a fifth correspondence, and determine the adjustment instruction based on the working parameter. The fifth correspondence may include that the accuracy of the composition analyzing device and the operating parameter of the pipeline regulating device are negatively correlated to the monitoring accuracy. The lower the monitoring accuracy is, the higher an increase in the accuracy, and the higher an increase in the operating parameter. The calibration cycle is positively correlated to the monitoring accuracy. The lower the monitoring accuracy is, the shorter the calibration cycle is.

In some embodiments, in response to the monitoring accuracy satisfying a third preset condition, the smart gas government safety supervision management platform may generate and send the adjustment instruction to the smart gas device object platform based on the monitoring accuracy. After the smart gas device object platform adjusts at least one of the composition analyzing device or the pipeline regulating device in accordance with the working parameter, if the monitoring accuracy after adjustment still meets the third preset condition, the smart gas government safety supervision management platform may generate and send a manual maintenance instruction to the gas company management platform. If the monitoring accuracy does not meet the third preset condition, but meets the fourth preset condition, the smart gas government safety supervision management platform may determine the gas component data based on at least one set of candidate component data and a candidate component influence coefficient corresponding to the candidate component data. Descriptions regarding adjusting the composition analyzing device and the pipeline regulating device may be found in the relevant description above.

In some embodiments, the third preset condition may include the monitoring accuracy being less than a second accuracy threshold. The fourth preset condition may include the monitoring accuracy being greater than the second accuracy threshold and less than the first accuracy threshold. The first accuracy threshold is greater than the second accuracy threshold.

In some embodiments, the first accuracy threshold and the second accuracy threshold may be correlated to an abnormal frequency, an inspection interval, a gas flow rate, an average monitoring discrepancy degree, etc. The higher the abnormal frequency, the longer the inspection interval, the larger the gas flow rate, and the larger the average monitoring discrepancy degree, the higher the first accuracy threshold and the second accuracy threshold. The larger the gas flow rate is, the greater the importance of the gas pipeline is. The larger the average monitoring discrepancy degree is, the greater a degree of discrepancy between historical feedback monitoring data and the historical component data, and the greater the need for focused supervision of the gas pipeline.

The abnormal frequency refers to a frequency at which the monitoring accuracy is less than the second accuracy threshold. The inspection interval is a time interval since the last maintenance of the composition analyzing device. The average monitoring discrepancy degree refers to an average of historical monitoring discrepancy degrees. Descriptions regarding the historical monitoring discrepancy degree may be found in FIG. 3 and the relevant descriptions thereof.

In some embodiments, the smart gas government safety supervision management platform may determine a frequency at which the monitoring accuracy falls below a second accuracy threshold within the first historical time, retrieve a time of the last maintenance of the composition analyzing device through the gas company management platform, and determine a time interval since the last maintenance of the composition analyzing device. The smart gas government safety supervision management platform may determine an average of historical monitoring discrepancy degrees as the average monitoring discrepancy degree.

Based on the abnormal frequency, the inspection interval, the gas flow rate, and the average monitoring discrepancy degree, a more reasonable first accuracy threshold and a more reasonable second accuracy threshold can be determined, which is conducive to accurately selecting subsequent operations, generating and sending the adjustment instruction or the manual maintenance instruction in a timely manner, or changing the way in which the gas component data is determined.

In some embodiments, after the smart gas device object platform adjusts at least one of the composition analyzing device or the pipeline regulating device based on the working parameter, the smart gas government safety supervision management platform may acquire the gas component data and determine the monitoring accuracy corresponding to the gas component data. If the monitoring accuracy still meets the third preset condition, the smart gas government safety supervision management platform may generate and send the manual maintenance instruction to the gas company management platform.

The manual maintenance instruction refers to an instruction used to control the gas company management platform in assigning maintenance personnel to perform maintenance on the composition analyzing device.

In some embodiments, in response to the monitoring accuracy not meeting the third preset condition and meeting the fourth preset condition, the smart gas government safety supervision management platform may change the manner in which the gas component data is determined. For example, the smart gas government safety supervision management platform may weigh and sum at least one set of candidate component data based on the at least one set of candidate component data and the component influence coefficient corresponding to the candidate component data, and a result of the weighted summation may be determined as the gas component data. A weight of each set of candidate component data may be negatively correlated to the component influence coefficient corresponding to the set of candidate component data. The larger the component influence coefficient corresponding to the candidate component data is, the smaller the weight of the candidate component data.

The at least one set of candidate component data refers to at least one set of gas component data of the gas collected a plurality of times by the composition analyzing device.

In some embodiments, in response to the monitoring accuracy not meeting the third preset condition and the fourth preset condition, but the component influence coefficient is relatively high, the smart gas government safety supervision management platform may control the composition analyzing device via the smart gas device object platform to reacquire the target gas and determine the gas component data based on the target gas.

By determining whether the monitoring accuracy satisfies the third preset condition, it is possible to generate and send the adjustment instruction or the manual maintenance instruction in time to adjust or repair the composition analyzing device and the pipeline regulating device when the monitoring accuracy is low, thereby avoiding obtaining a large amount of inaccurate gas component data. By determining whether the monitoring accuracy satisfies the fourth preset condition, the manner of determining the gas component data can be changed when the monitoring accuracy is moderate, thereby improving the accuracy of the gas component data.

By determining whether the uniformity degree meets the first preset condition and then adjusting the pipeline regulating device, the gas input to the composition analyzing device can be made more uniform, which makes the results output from the composition analyzing device more accurate. In addition, based on the uniformity degree and the environmental data, the degree of influence of environmental factors on the accuracy of the composition analyzing device can be determined. If the component influence coefficient is relatively large, the monitoring accuracy is determined and the composition analyzing device and the pipeline regulating device are adjusted based on the monitoring accuracy to ensure the accuracy of gas monitoring.

It should be noted that the foregoing description of the process 200 is intended to be exemplary and illustrative only and does not limit the scope of application of the present disclosure. For those skilled in the art, various corrections and changes to process 200 may be made under the guidance of the present disclosure. However, these corrections and changes remain within the scope of the present disclosure.

FIG. 3 is a flowchart of an exemplary process for determining a monitoring accuracy according to some embodiments of the present disclosure. In some embodiments, process 300 is performed by a smart gas government safety supervision management platform. As shown in FIG. 3, process 300 includes the following operations.

In 310, determining effective feedback information based on feedback information.

In some embodiments, a sampling parameter may include sampling user information. The smart gas government safety supervision management platform may determine the sampling parameter based on a component influence coefficient, generate a retrieval instruction based on the sampling parameter, and send the retrieval instruction to a gas user platform to control the gas user platform to obtain the feedback information uploaded by a gas user in accordance with the sampling parameter. Descriptions of generating and sending the retrieval instruction to the gas user platform to control the gas user platform to obtain the feedback information uploaded by the gas user in accordance with the sampling parameter may be found in FIG. 2 and its related description.

The sampling user information refers to information related to the gas user who uploaded the feedback information. In some embodiments, the sampling user information may include a count of sampling users, a range of sampling users, etc. The count of sampling users is the count of gas users who uploaded the feedback information. The range of sampling users is the range of gas users who uploaded the feedback information.

In some embodiments, the smart gas government safety supervision management platform may determine the sampling parameter based on the component influence coefficient in a plurality of ways. For example, the smart gas government safety supervision management platform may determine an absolute value of a difference between the component influence coefficient and a coefficient threshold based on the component influence coefficient, and determine the sampling parameter based on the absolute value by a preset relationship. The preset relationship includes the sampling parameter negatively correlating to the absolute value of the difference between the component influence coefficient and the coefficient threshold. The smaller the absolute value is, the greater the count of sampling users and the greater the range of sampling users. The coefficient threshold may be preset based on historical experience.

Understandably, the larger the absolute value of the difference between the component influence coefficient and the coefficient threshold is, the less accurate the gas component data is, and only a small amount of data needs to be analyzed to determine the monitoring accuracy. Conversely, the smaller the absolute value is, the more accurate (but not absolute accurate) the gas component data is, thus a large amount of data needs to be analyzed to determine the monitoring accuracy.

In some embodiments, the smart gas government safety supervision management platform may construct a retrieval feature vector based on the component influence coefficient, a current time point, a user usage characteristic, and historical feedback quality, and match the retrieval feature vector with a second reference vector that satisfies a preset matching condition in a second vector database. A reference sampling parameter corresponding to the second reference vector that satisfies the preset matching condition is determined as the sampling parameter. The retrieval feature vector may be a feature vector constructed based on the component influence coefficient, the current time point, the user usage characteristic, and the historical feedback quality. See FIG. 2 for a description of the preset matching condition.

The user usage characteristic refers to a characteristic of gas usage by the gas user. For example, the user usage characteristic may include a form of the feedback information, a time of gas usage, an amount of consumed gas, or the like. In some embodiments, the gas user platform may obtain and upload the user usage characteristic to the smart gas government safety supervision management platform.

The historical feedback quality refers to the quality of the feedback information uploaded by the gas user in the first historical time. The historical feedback quality may be determined by manual labeling. For example, the higher a percentage of effective feedback information in the feedback information in the first historical time, the larger an information volume, and the more accurate the wording, the higher the historical feedback quality.

In some embodiments, the smart gas government safety supervision management platform may construct a second vector database based on the historical data. The second vector database may include a plurality of second reference vectors and a plurality of reference sampling parameters corresponding to the second reference vectors. The second reference vectors may be feature vectors constructed based on historical component influence coefficients, historical time points, historical user usage characteristics, and historical feedback quality in the historical data. The reference sampling parameters may be determined by manual labeling. The historical feedback quality in the second reference vector refers to the quality of the feedback information uploaded by the gas user during the second historical time. Descriptions of the first historical time and the second historical time may be found in FIG. 2 and its related descriptions.

Determining the sampling parameter based on the component influence coefficient allows for the collection of an appropriate amount and range of feedback information, thereby reducing computational load. Additionally, by considering the gas usage characteristic and the historical feedback quality when determining the sampling parameter, a more reasonable sampling parameter can be determined.

The effective feedback information refers to feedback information that excludes useless information.

In some embodiments, the smart gas government safety supervision management platform may determine effective feedback information in various manners based on the feedback information. For example, for text- and voice-based feedback information, the smart gas government safety supervision management platform may perform keyword matching against a predefined keyword database, filtering out feedback information that does not contain relevant keywords to obtain the effective feedback information. As another example, for image- and video-based feedback information, the smart gas government safety supervision management platform may use a preset recognition technique to identify key features within the feedback information and exclude content that does not include the key features, thereby obtaining the effective feedback information. The preset recognition technique may include an image recognition algorithm, an image recognition model, or the like. The image recognition algorithm may include support vector machine (SVM) algorithm, a principal component analysis (PCA) algorithm, or the like. The image recognition model may include a YOLO model, a Faster R-CNN model, a U-Net model, or the like. The keyword database may be pre-configured based on historical experience and contains a large number of keywords.

The keywords refer to descriptions related to gas usage, for example, the size of the flame in which the gas burns, how much smoke is produced, and so on.

The key features refer to images of features associated with gas usage, for example, an image of a gas furnace or a gas pipeline, an image of a gas flame color, a smoke image, or the like.

In some embodiments, the smart gas government safety supervision management platform may convert the keywords and the key features in the effective feedback information into key feature vectors using a preset conversion algorithm, identify an abnormal feature vector using an outlier detection algorithm, and exclude the effective feedback information corresponding to the abnormal feature vector. The preset conversion algorithm may include a Bag of Words model, a TF-IDF model, a word embedding (e.g., Word2Vec and GloVe) model, a BERT embedding model, etc. The outlier detection algorithm may include an Isolation Forest algorithm, a Local Outlier Factor (LOF) algorithm, or the like.

The abnormal feature vector refers to a key feature vector that is significantly different from the rest of the key feature vectors.

It may be understood that if a piece of effective feedback information shows a significant difference from the rest of the effective feedback information, it indicates that the piece of feedback information may be erroneous. Excluding the piece of feedback information can lead to more accurate monitoring accuracy. For example, if the keywords in the effective feedback information from an upstream gas user indicate abnormal combustion, but the keywords in the effective feedback information from multiple downstream gas users indicate normal combustion, it may suggest that a gas device of the upstream user is experiencing issues, which are unrelated to the monitoring accuracy.

In 320, determining comparative feature data based on the effective feedback information.

The comparative feature data may characterize a key feature of the effective feedback information. In some embodiments, the smart gas government safety supervision management platform may designate the keywords, the key features, or the key feature vectors corresponding to the effective feedback information as the comparative feature data.

In 330, determining a confidence weight corresponding to the feedback information based on the feedback information.

In some embodiments, the smart gas government safety supervision management platform may determine the confidence weight corresponding to the feedback information based on the feedback information. More descriptions of the determination of confidence weight corresponding to the feedback information may be found in FIG. 2 and the related descriptions thereof.

In some embodiments, the confidence weight may be correlated to a historical monitoring discrepancy degree. The historical monitoring discrepancy degree may characterize a degree of discrepancy between historical feedback monitoring data and historical component data. In some embodiments, the historical monitoring discrepancy degree may be expressed as a numerical value or a percentage. The greater the numerical value or the percentage is, the greater the historical monitoring discrepancy degree is. Descriptions of the historical component data may be found in FIG. 2 and its related description.

The historical feedback monitoring data refers to feedback monitoring data during the first historical time. The feedback monitoring data refers to gas component data uploaded from a gas branch station around the gas user. In some embodiments, the feedback monitoring data may be obtained by a composition analyzing device deployed at the gas branch station.

In some embodiments, the smart gas government safety supervision management platform may construct a first vector based on the historical component data, construct a second vector based on the historical feedback monitoring data, and determine a vector distance between the first vector and the second vector. Based on the vector distance, the historical monitoring discrepancy degree may be determined. The smaller the vector distance is, the greater the historical monitoring discrepancy degree is. The vector distance may include a Euclidean distance, a cosine distance, or the like.

In some embodiments, the smart gas government safety supervision management platform may update the confidence weight corresponding to the feedback information based on the historical monitoring discrepancy degree and the confidence weight corresponding to the feedback information. For example, the smart gas government safety supervision management platform may normalize and sum historical monitoring discrepancy degrees and confidence weights corresponding to the feedback information, and determine a result of the summation as the updated confidence weight.

Considering the historical monitoring discrepancy degree when determining the confidence weight of the feedback information allows for the determination of a more reasonable confidence weight.

In 340, constructing an accuracy feature map based on the comparative feature data, the confidence weight corresponding to the feedback information, the gas component data, and the component influence coefficient.

FIG. 4 is a schematic diagram of an exemplary accuracy determination model according to some embodiments of the present disclosure. An accuracy feature map 420 refers to a graph structure that contains information of a relationship between gas user and gas pipelines. The graph structure refers to a data structure comprising nodes and edges, wherein the edges connect the nodes, and the nodes and the edges may have features. The edges are directed edges, and the direction of the edges indicate the direction of gas flow.

In some embodiments, the smart gas government safety supervision management platform may construct the accuracy feature map 420 based on comparative feature data 411, a confidence weight 412 corresponding to the feedback information, gas component data 413, and a component influence coefficient 414. The nodes of the accuracy feature map 420 include user nodes, common pipeline nodes, and target pipeline nodes (e.g., a user node 423, a common pipeline node 422, a target pipeline node 421 . . . ). The user node refers to a node representing a gas user. The target pipeline node refers to a node that represents a gas pipeline where a target gas is located. The common pipeline node refers to a node that represents a gas pipeline other than the target pipeline node in gas pipelines of a gas gate station.

In some embodiments, a node feature of the user node in the accuracy feature map 420 includes the comparative feature data and the confidence weight corresponding to the feedback information, a node feature of the common pipeline node includes gas monitoring data corresponding to the common pipeline, and a node feature of the target pipeline node includes the gas monitoring data, the gas component data, the component influence coefficient, and historical component data corresponding to the target pipeline. An edge feature includes the direction of gas flow. The gas monitoring data corresponding to the common pipeline node may be obtained by a gas monitoring device deployed within the common pipeline.

In some embodiments, the node feature of the user node may include feedback monitoring data, or the like. The node feature of the ordinary node may also include a component influence coefficient and a monitoring accuracy corresponding to the common pipeline, or the like.

In some embodiments, the smart gas government safety supervision management platform may determine the component influence coefficient and the monitoring accuracy corresponding to the common pipeline based on the gas component data corresponding to the common pipeline. The determination of the component influence coefficient corresponding to the common pipeline and the monitoring accuracy is similar to the determination of the component influence coefficient and the monitoring accuracy described in FIG. 2 and FIG. 3 above. The gas component data corresponding to the common pipeline may be collected and acquired by a composition analyzing device deployed within the common pipeline.

In some embodiments, if the node feature of the user node includes the feedback monitoring data and the node feature of the ordinary node includes the component influence coefficient and the monitoring accuracy corresponding to the common pipeline, the node feature of the user node in the sample accuracy feature map further includes sample feedback monitoring data, and the node feature of the ordinary node further includes sample component influence coefficient and sample monitoring accuracy corresponding to the common pipeline.

In 350, determining the monitoring accuracy by an accuracy determination model based on the accuracy feature map.

In some embodiments, the smart gas government safety supervision management platform may input the accuracy feature map 420 into an accuracy determination model 430 to obtain a monitoring accuracy 440.

The accuracy determination model 430 refers to a model for determining the monitoring accuracy. In some embodiments, the accuracy determination model 430 may be a machine learning model. For example, the accuracy determination model may include a Graph Neural Network (GNN) model, a customized model structure, or the like, or any combination thereof.

In some embodiments, the smart gas government safety supervision management platform may train the accuracy determination model 430 based on a training set using a gradient descent technique, or the like. The training set includes a large count of second training samples with second labels. The second training sample may include a sample accuracy feature map, and the second label of the second training sample may be an actual monitoring accuracy corresponding to sample gas component data. In some embodiments, the sample accuracy feature map may include a historical accuracy feature map determined based on historical data. Nodes of the historical accuracy feature map and their features, edges of the historical accuracy feature map, and features of the nodes and edges are similar to the nodes, the edges, the node features, and the edge features of the accuracy feature map described above.

In some embodiments, the smart gas government safety supervision management platform may determine a difference between standard gas component data and the sample gas component data in the sample accuracy feature map, and determine, via a preset correspondence, the sample gas component data corresponding to the actual monitoring accuracy. The preset correspondence may include that the larger the difference between the standard gas component data and the sample gas component data is, the lower the actual monitoring accuracy corresponding to the sample gas component data is. More descriptions of the standard gas component data may be found in FIG. 2 and its related descriptions.

The training process of the accuracy determination model 430 is similar to the training process of the coefficient determination model described in FIG. 2 and the related descriptions thereof.

The node feature of the user node may include feedback monitoring data, and the node feature of the ordinary node further includes the component influence coefficient and the monitoring accuracy corresponding to the ordinary pipeline. This allows obtaining an accuracy feature map that better reflects the node features.

In some embodiments, a variance of global confidence levels of the sample accuracy feature maps in the training set for the training the accuracy determination model satisfies a preset confidence condition.

The global confidence level may reflect a confidence degree of the sample accuracy feature maps. The larger the variance of the global confidence levels is, the more diverse the sample accuracy feature maps in the training set are.

In some embodiments, the smart gas government safety supervision management platform may weight and sum data volumes of a plurality of pieces of sample effective feedback information based on sample comparative feature data corresponding to a plurality of user nodes in the sample accuracy feature maps and weights of the sample effective feedback information. A result of the weighted summation is determined as the global confidence level of the sample accuracy feature maps. The weights corresponding to the sample effective feedback information may be preset based on types of the sample effective feedback information.

In some embodiments, the smart gas government safety supervision management platform may determine the data volumes of the sample effective feedback information in various ways. For example, the smart gas government safety supervision management platform may use a keyword counting technique to determine the data volumes of text-based sample effective feedback information. As another example, the smart gas government safety supervision management platform may use a pixel area calculation technique or a keyframe extraction technique to determine the data volumes of image-based sample effective feedback information. As yet another example, the smart gas government safety supervision management platform may use a duration-based technique or a key feature counting technique to determine the data volumes of video-based sample effective feedback information.

In some embodiments, the smart gas government safety supervision management platform may normalize the data volumes of the sample effective feedback information in different formats.

The preset confidence condition refers to a condition for determining whether the training set for training the accuracy determination model meets training requirements. In some embodiments, the preset confidence condition may include the variance of the global confidence levels being greater than a variance threshold.

In some embodiments, the variance threshold may be negatively correlated to a count of samples in the training set and quality of the samples. The higher the count of the samples and the better the quality of the samples are, the lower the variance threshold is. The quality of the samples may be manually determined by labeling based on completeness, noise, or the like.

In some embodiments, the variance of the global confidence levels of the sample accuracy feature maps in the training set satisfies the preset confidence condition, which ensures the diversity of the sample accuracy feature maps in the training set, thereby improving the generalizability of the accuracy determination model.

By constructing the accuracy feature map, scattered and vast amounts of data can be effectively organized, facilitating the quick and efficient extraction of the relationship between gas users and gas pipelines, as well as the features thereof. By processing the accuracy feature map with the accuracy determination model, the self-learning capabilities of machine learning models can be leveraged to identify patterns from large datasets, thereby enhancing the accuracy and efficiency of determining the monitoring accuracy.

It should be noted that the foregoing description of the process 300 is intended to be exemplary and illustrative only and does not limit the scope of application of the present disclosure. For those skilled in the art, various corrections and changes to the process 300 may be made under the guidance of the present disclosure. However, these corrections and changes remain within the scope of the present disclosure.

Some embodiments of the present disclosure further provide a non-transitory computer-readable storage medium storing computer instructions. When a computer reads the computer instructions in the storage medium, the computer executes the method for monitoring gas at a smart gas gate station based on safety supervision described in any of the above embodiments.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for monitoring gas at a smart gas gate station based on safety supervision, the method being executed by a smart gas government safety supervision management platform of an Internet of Things (IoT) system for monitoring gas at a smart gas gate station based on safety supervision, wherein the Internet of Things (IoT) system is configured as a computer system including a processor, the Internet of Things (IoT) system includes a gas company management platform, a smart gas government safety monitoring sensor network platform, a smart gas device object platform, a gas user platform, and the smart gas government safety supervision management platform, the gas company management platform is configured as a server of a gas company, the smart gas government safety monitoring sensor network platform is configured as a communication network, the smart gas device object platform is configured as a structural device that includes a gas monitoring device, a composition analyzing device, and a pipeline regulating device, the composition analyzing device includes a gas detector, the gas user platform includes a device terminal used by a gas user, the smart gas government safety supervision management platform is configured as at least one distributed server which includes a storage device, and the method comprises:
obtaining gas monitoring data uploaded by the gas company management platform through the smart gas government safety monitoring sensor network platform, and determining a uniformity degree of the gas based on the gas monitoring data;
in response to the uniformity degree satisfying a first preset condition, controlling the composition analyzing device of the smart gas device object platform to collect a target gas, and determining gas component data based on the target gas, the composition analyzing device being deployed in a gas pipeline of the gas gate station;
obtaining the gas component data and environmental data uploaded by the gas company management platform through the smart gas government safety monitoring sensor network platform;
determining a component influence coefficient based on the uniformity degree and the environmental data;
in response to the component influence coefficient satisfying a second preset condition, generating and transmitting a retrieval instruction to the gas user platform, the retrieval instruction being configured to instruct the gas user platform to obtain, based on a sampling parameter, feedback information uploaded by a gas user, the sampling parameter including a sampling time point;
determining a confidence weight corresponding to the feedback information based on the feedback information;
determining a monitoring accuracy based on the feedback information, the confidence weight corresponding to the feedback information, the gas component data, and the component influence coefficient; and
generating and sending an adjustment instruction to the smart gas device object platform based on the monitoring accuracy, including:
in response to the monitoring accuracy satisfying a third preset condition, generating and sending the adjustment instruction to the smart gas device object platform based on the monitoring accuracy;
in response to the monitoring accuracy satisfying the third preset condition after the smart gas device object platform adjusts at least one of the composition analyzing device and the pipeline regulating device based on a working parameter, generating and sending a manual maintenance instruction to the gas company management platform; and
in response to the monitoring accuracy not satisfying the third preset condition and satisfying a fourth preset condition, determining the gas component data based on at least one set of candidate component data and at least one component influence coefficient corresponding to the at least one candidate component data;
wherein the method further comprises:
adjusting based on the adjustment instruction and the working parameter, at least one of the composition analyzing device and the pipeline regulating device deployed in the gas pipeline, the working parameter including at least one of an analysis accuracy of the composition analyzing device, a calibration cycle of the composition analyzing device, and an operating parameter of the pipeline regulating device.

2. The method of claim 1, wherein the determining a component influence coefficient based on the uniformity degree and the environmental data includes:
determining the uniformity degree based on the gas monitoring data and a monitoring device parameter, the monitoring device parameter including distribution locations of gas monitoring devices for obtaining the gas monitoring data; and
determining the component influence coefficient based on the uniformity degree, the environmental data, and the gas component data.

3. The method of claim 1, wherein the second preset condition includes the component influence coefficient being greater than an influence threshold, the influence threshold being determined based on a historical monitoring accuracy, the determining a monitoring accuracy based on the feedback information, the confidence weight corresponding to the feedback information, the gas component data, and the component influence coefficient includes:
determining effective feedback information based on the feedback information;

determining comparative feature data based on the effective feedback information;

constructing an accuracy feature map based on the comparative feature data, the confidence weight corresponding to the feedback information, the gas component data, and the component influence coefficient; and determining the monitoring accuracy by an accuracy determination model based on the accuracy feature map, the accuracy determination model being a machine learning model.

4. The method of claim 3, wherein the sampling parameter further includes sampling user information, the sampling user information includes a count of sampling users and a range of the sampling users, and the method further comprises:

determining the sampling parameter based on the component influence coefficient; and generating and sending the retrieval instruction to the gas user platform based on the sampling parameter to control the gas user platform to retrieve, based on the sampling parameter, the feedback information uploaded by the gas user.

* * * * *